(12) United States Patent
Joyce

(10) Patent No.: US 6,262,190 B1
(45) Date of Patent: Jul. 17, 2001

(54) PROCESS AND APPARATUS FOR FLUID BED POLYMERIZATION

(75) Inventor: William Helmer Joyce, Newton, CT (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/247,414

(22) Filed: Feb. 10, 1999

(51) Int. Cl.⁷ .................................................... C08F 2/34
(52) U.S. Cl. .................. 526/61; 526/59; 526/64; 526/73; 526/88; 526/901
(58) Field of Search .................. 526/64, 73, 88, 526/901, 59, 61

(56) References Cited

U.S. PATENT DOCUMENTS

| 2,876,079 | 3/1959 | Upchurch et al. .................. 23/284 |
| 4,320,089 | 3/1982 | Huttlin .................. 422/140 |
| 4,518,750 | * 5/1985 | Govoni et al. .................. 422/143 X |
| 4,521,378 | * 6/1985 | Ichimura et al. .................. 422/143 X |
| 4,615,382 | 10/1986 | Klaren .................. 165/104.16 |
| 5,014,632 | 5/1991 | Isaksson .................. 110/347 |
| 5,381,827 | 1/1995 | Koura et al. .................. 137/561 A |
| 5,676,201 | 10/1997 | Klaren .................. 165/95 |
| 5,753,191 | 5/1998 | Yamamoto et al. .................. 422/143 |

\* cited by examiner

*Primary Examiner*—Fred Teskin

(57) ABSTRACT

In gas phase fluid bed polymerization processes, operation can be achieved over wider ranges of fluidizing gas velocities without incurring undue energy costs by adjusting the pressure drop through the grid below the bed to provide a ratio of pressure drop through the grid to pressure drop through the grid and bed above about 0.15:1. The range of fluidizing gas velocities can enhance the practicality of operating the processes over varying bed heights while reducing the risk of forming deposits of polymer. The processes of the invention are particularly useful to accommodate start-ups, catalyst transitions and shutdowns.

15 Claims, 4 Drawing Sheets

PROCESS AND APPARATUS FOR FLUID BED POLYMERIZATION

FIELD OF THE INVENTION

This invention pertains to processes and apparatus for operating gas phase fluidized bed polymerization processes at low bed heights in the polymerization vessel while maintaining adequate bed fluidization. The processes and apparatus of this invention are particularly useful in start-ups and in transitioning from the use of one catalyst to another catalyst (luring operation of the polymerization process while minimizing the amount of off-grade material inherently produced due to the presence, of two catalyst during the transitioning.

BACKGROUND OF THE INVENTION

Gas phase fluidized bed polymerization processes find extensive use in the preparation of olefinic polymers, particularly polyethylene and polypropylene. The properties of the resultant polymer are often determined by the catalyst used. From time to time it may be desired to produce a different polymer in a given gas phase fluidized bed polymerization apparatus. In such event, the catalyst change is effected by what is known as transitioning. In transitioning, the feed of the first catalyst is ceased and replaced with the feed of a second catalyst to the polymerization zone. Since both catalysts will be present during the transitioning, the resultant product will thus not meet the product specifications for the polymer made with the first catalyst nor for the polymer made from the second catalyst. Over a period of time, the first catalyst is consumed and discharged from the reactor and polymer made from the second catalyst predominates. In order to meet the product specifications for polymer made with the second catalyst, normally at least three bed turnovers occur. A bed turnover occurs when the amount of product discharged from the reactor equals the amount of polymer contained in the fluidized bed. Considering that many of the world class gas phase fluidized bed polymerization processes contain 50 metric tones or more of polymer within the fluidized bed at any given time, the amount of off specification material produced can be quite substantial during a catalyst transition.

One way that has been contemplated for reducing the amount of polymer produced during a catalyst transition is to lower the height of the fluidized bed. Unfortunately, in gas phase fluidized bed polymerization processes, lowering bed height is not without problems.

The essence of the problem is to maintain the walls of the reactor and the expanded zone above the reactor relatively free from polymer deposits. The upward flow of the fluidizing gas entrains small particles which are carried into an expanded section of the reactor vessel above the fluidized bed. In the expanded section, the reduced gas velocity results in these smaller particles disengaging from the gas and returning to the bed. Some of these disengaged particles will contact and adhere to the walls of the expanded section or reactor. Since the particles in the bed contain active catalyst and the gas contains reactive monomer, the particles can continue to grow. The adhering particles may continue to polymerize forming aggregates, or sheets, of polymer. These aggregates of polymer, if allowed to form, may shed and fall into the fluidized bed. The agglomerates may not meet product quality specifications and, may be of such a size as to disrupt the fluidization of the bed. This disruption could become catastrophic and lead to a reactor shutdown.

The frequency and size of polymer deposits has been found to be attenuated by maintaining the top of the bed proximate to the expanded section such that the bed surface disruptions associated with the fluidization of the bed result in a substantial flow of larger particles into the expanded section. For instance, in commercial scale units which may have diameters as great as 5 meters and height exceeding 20 to 25 meters, the fluidization activity within the bed becomes quite violent. The violent nature of the fluidization can be readily appreciated from the fact that the upwardly flowing gases through the fluidized bed coalesce to form bubbles having diameters in excess of 2 meters by the time they burst through the top of the fluidized bed. The gases are often flowing at a velocity of at least about 0.5, and sometimes in excess of 2, meters per second.

This flow of larger particles tends to scrub deposits of polymer from the wall prior to forming deleterious agglomerates. Accordingly, dropping the level of the bed would reduce the amount of larger particles flowing into the expanded section and could significantly increase the risk of undesirable agglomerates being generated on the walls of the expanded section.

Reducing the velocity of the upwardly flowing gas can reduce the amount of smaller particles being carried above the fluidized bed. However, velocity reduction poses a problem in maintaining desirable fluidization of the bed. As the bed height is reduced, the pressure drop to the fluidizing gas is proportionately reduced since the pressure drop caused by the bed is directly related to the weight of the bed. But, the pressure drop to the gas as it passes through the grid changes substantially since pressure drop is a function of the square of the velocity of the gas. Thus, the ratio of the pressure drop across the distribution plate to total pressure drop changes with changes in gas velocity.

By way of background, the pressure drop across the grid, or distribution plate ($\Delta P_p$), should be sufficient to assure a substantially even distribution of the fluidizing gas over the cross section of the fluidized bed. This distribution is necessary not only for the fluidization of the bed but also to prevent particles from agglomerating or other untoward consequences in the polymerization environment. Typically, $\Delta P_p$ should be greater than about 15 percent of the total pressure drop ($\Delta P_T$) across the bed and distribution plate. An economic balance exists, if the size of the openings in the distribution plate are smaller in order to provide a desired $\Delta P_p/\Delta P_T$ ratio over a range of fluidizing gas velocities, then greater the energy costs will be incurred to provide desired fluidization at advantageous fluidizing gas velocities at full bed height. Typically prior to this invention, the distribution plate is designed as a compromise between achieving energy savings and the range in operable fluidizing gas velocities and thus the range in bed heights.

Processes and apparatus are therefore needed to enable fluid bed operations over a wide range of bed heights to facilitate star-up and especially to reduce the amount of off-specification material produced during catalyst transitions.

SUMMARY OF INVENTION

In accordance with the broadest aspects of this invention, processes and apparatus are provided to enable operation of a gas phase fluidized bed polymerization processes over a wide range of fluidizing gas velocities while reducing the risk of deposits of polymer on the walls of the reactor vessel and while enhancing energy savings. The processes and apparatus of this invention are particularly useful in permitting start-up with a relatively small seed bed of polymer and in reducing the generation of off-specification product during a catalyst transition during continuous operation and in effecting reactor shutdowns.

The polymerization vessels used in the invention can generally be described as having walls defining a cylindrical main section and a grid having gas permeable openings. The grid is at a lower region of the main section above which the fluidized bed resides and induces a pressure drop to gas passing through its openings. Most often, the vessels include an expanded section integral with and above the main section.

In broad aspects of the processes of this invention, a gas containing monomer is upwardly and continuously passed through the grid and into the main section of the polymerization vessel at a first velocity sufficient to maintain the fluidized bed at a first height in a fluidized condition wherein the openings in the grid are sufficient to provide a ratio of the pressure drop through the grid ($\Delta P_p$) to the pressure drop through the grid and bed ($\Delta P_T$) is at least about 0.15:1, preferably at least about 0.2:1; the amount of polymer particles in the bed is changed from a first height to a second height; and passing the gas into the main section of the polymerization vessel at a second, lower velocity sufficient to maintain the fluidized bed at the second height in a fluidized condition wherein the openings in the grid are adjusted to maintain a ratio of the pressure drop through the grid to the pressure drop through the grid and bed ($\Delta P_p/\Delta P_T$) of at least about 0.15:1, preferably at least about 0.2:1. Preferably, at neither the first nor the second height is the $\Delta P_p:\Delta P_T$ ratio greater than about 0.4:1.

A further aspect of the processes of this invention comprises:

a) upwardly passing gas containing monomer for polymerization through the grid and into the main section of the polymerization vessel at a velocity sufficient to maintain the fluidized bed in a fluidized condition wherein the ratio of the pressure drop through the grid ($\Delta P_p$) to the pressure drop through the grid and bed ($\Delta P_T$) is at least about 0.15:1, and preferably between about 0.2 to 0.35:1, wherein said velocity is also sufficient to i) entrain and carry particles into the expanded section and ii) extend the bed to a first height in the reactor;

b) reducing the velocity of the upwardly passing gas to a second superficial velocity sufficient to maintain the fluidized bed in a fluidized condition and to reduce the amount of particles carried into the expanded section;

c) removing polymer particles from the main section to reduce the height of the bed to a second height; and d) at least once during steps b) and c) adjusting the pressure drop through the grid to maintain the $\Delta P_{p:\Delta PT}$ ratio at least about 0.15:1, preferably between about 0.2 to 0.4:1.

In preferred aspects of the invention, the height of the bed is reduced to less than about 30, more preferably to less than about 25, and sometimes to between about 5 to 15, percent of the maximum design height for the bed in the vessel. The maximum design height is the distance from the grid to the top of the main section of the vessel.

The apparatus of this invention comprise a substantially cylindrical, vertical main section defined by gas impermeable walls; a grid substantially transverse to the axis of the cylindrical main section at a lower region of the main section, wherein the grid defines a plurality of openings, each having an effective cross section for gas passage; an expanded section integral with and at the top of the main section; a gas recycle system to provide gas flow communication between an upper portion of the expanded section and below the grid; and means to reversibly reduce the effective cross section of at least some of the plurality of openings in the grid. The means to reversibly reduce the effective cross section of openings in the grid include by way of example a flow restrictor that is inserted into the opening or occludes the opening.

BRIEF DESCRIPTION OF THE DRAWINGS

In FIG. 3, the lower plate is pivotably mounted and in FIG. 4 the plate is slideably mounted.

DETAILED DESCRIPTION OF THE INVENTION

Figure 1:
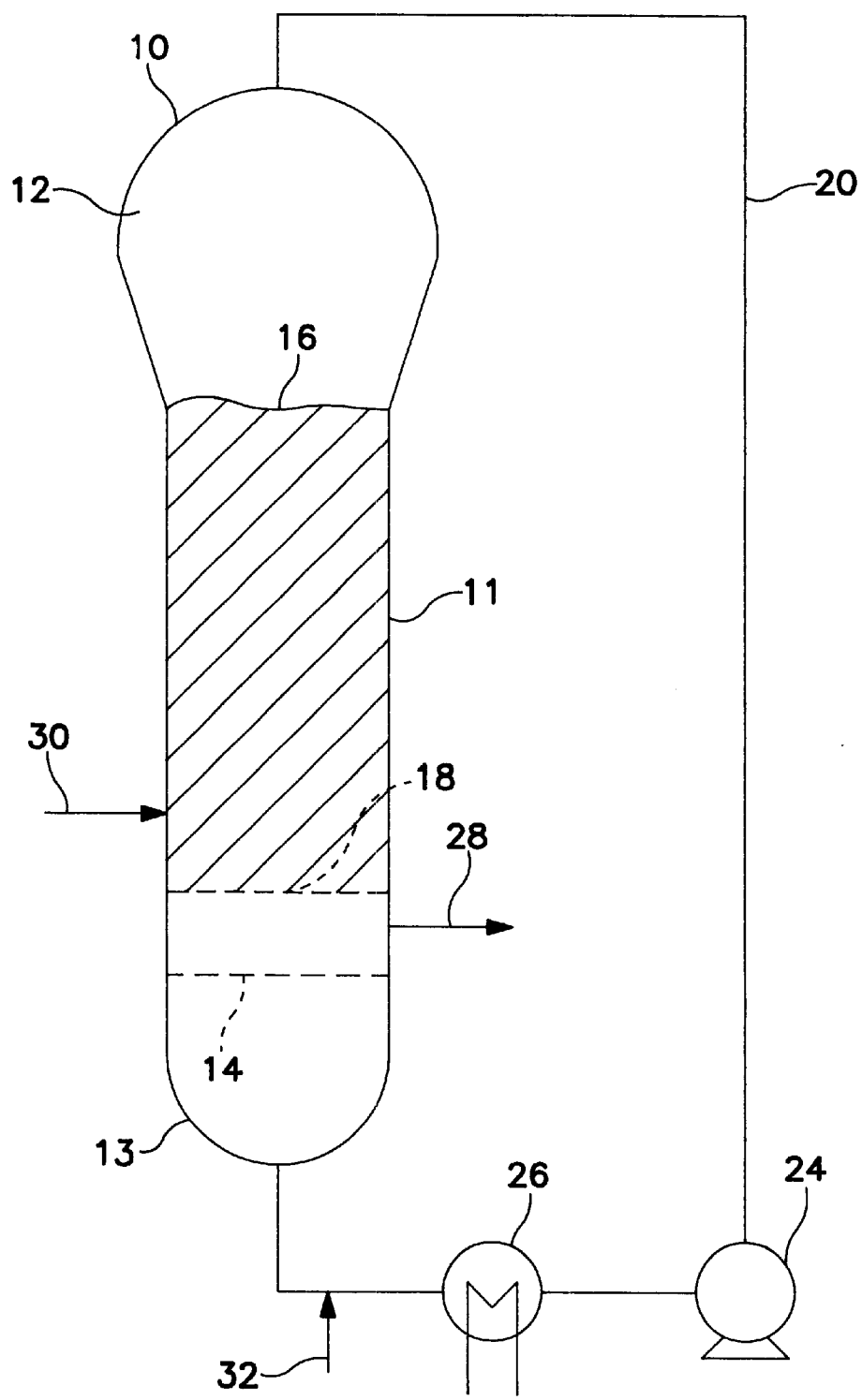
FIG. 1 is a schematic representation of a gas phase fluidized bed polymerization unit.

This invention pertains to processes that enable the operation of gas phase fluid bed polymerization reactors at materially reduced and at full bed heights without undue risk of deposits of polymer forming on the walls of the polymerization vessel. This invention finds particular benefit for catalyst transitions in fluid bed polymerization operations. The invention also pertains to novel apparatus for practicing the processes of this invention although it will be readily appreciated that the process may be practiced without requiring the apparatus of the invention.

In the processes, the gas phase fluidized bed is used for polymerization of fluid monomer to make solid polymer. The practice of this invention is not limited to any particular class or kind of polymerization or catalyst. This invention finds particular applicability to the polymerization of olefins, especially olefin polymerization reactions involving homopolymerization and copolymerization. The term copolymerization as used herein includes polymerization with two or more different of monomers.

Examples of these monomers include the following:

A. alpha olefins such as ethylene, propylene, butene-1, isobutylene, 4-methyl pentene, hexene-1, octene-1, decene-1, dodecene-1, etc. and styrene.

B. dienes such as hexadiene, vinyl cyclohexene, dicyclopentadiene, butadiene, isoprene, ethylidene norbornene and the like, and C. polar vinyl monomers such as acrylonitrile, maleic acid esters, vinyl acetate, acrylate esters, methacrylate esters, vinyl trialkyl silanes and the like.

Catalysts for olefin polymerizations include the conventional Ziegler-Natta catalysts, by which is meant those formed by reacting a metal alkyl or hydride with a transition metal compound, are preferred in the practice of this invention. Those formed by reacting an aluminum alkyl with compounds of metals of groups I to III of the periodic table are particularly useful.

Illustrative of the catalysts useful in the practice of this invention are the following:

A. Titanium based catalysts such as those described in U.S. Pat. Nos. 4,376,062 and 4,379,758.
B. Chromium based catalysts such as those described in U.S. Pat. Nos. 3,709,853; 3,709,954 and 4,077,904.
C. Vanadium based catalysts such as vanadium oxychloride, vanadium acetyl acetonate, and those described in U.S. Pat. No. 4,508,842.
D. Metallocene catalysts such as those described in U.S. Pat. Nos. 4,530,914; 4,665,047; 4,752,597; 5,218,071, 5,272,236 and 5,278,272.
E. Cationic forms of metal halides, such as aluminum trihalides.
F. Cobalt catalysts and mixtures thereof such as those described in U.S. Pat. Nos. 4,472,559 and 4,182,814.
G. Nickel catalysts and mixtures thereof such as described in U.S. Pat. Nos. 4,155,880 and 4,102,817.
H. Rare earth metal catalysts and mixtures thereof.

Other catalysts that may find application include:

A. cationic catalysts, particularly for the polymerization of isobutylene, styrene, butyl rubber, isoprene rubber and vinyl ethers, such as boron trifluoride (hydrated), aluminum trifluoride, sulfuric acid, hydrochloric acid (hydrated), and titanium tetrachloride;
B. anionic catalysts, particularly for the polymerization of butyl rubber, isoprene rubber, styrene and butyl rubber copolymer, and acrylonitrile) such as alkyl lithiums, $NaNH^2$, and $LiN(Et)^2$; and
C. free radical catalysts, particularly for polymerization of butyl rubber, isoprene rubber, styrene, vinyl halide, styrene butyl rubber copolymer, acrylonitrile-butadiene-styrene terpolymer and vinyl esters, such as azobisisobutyronitrile, benzoyl peroxide, acetyl peroxide, t-butyl peracetic acetate, cumyl peroxide, and t-butyl hydroperoxide.

The conditions for olefin polymerizations vary depending upon the monomers, catalysts and equipment availability. The specific conditions are known or readily derivable by those skilled in the art. Generally the temperatures are within the range of –10° C. to 120° C., often about 15° C. to 90° C., and pressures are within the range of 0.1 to 100, say, about 5 to 50, bar. Gas phase fluidized bed polymerization processes may also include the presence of liquid in the bed as described in U.S. Pat. No. 5,334,571. The liquid may be an inert or a monomer.

The processes of this invention may be useful for the preparation of condensation polymers. Polymers prepared by condensation processes include polyamides, polyesters, polyurethanes, polysiloxanes, phenol-formaldehyde polymers, urea-formaldehyde polymers, melamine-formaldehyde polymers, cellulosic polymers and polyacetals. These processes are characterized by the elimination of a lower molecular weight by product such as water or methanol. Since the condensation reactions ire generally equilibria reactions, the gas phase operation can assist in the removal of the lighter, and much more volatile, by products. The condensation polymerization reactions are frequently conducted at temperatures between about 60° and 250° C. and under pressures of up to about 100 bar. In general, lower pressures are preferred to favor the elimination of the by product. The processes may involve the use of catalysts including alkaline and acidic catalysts. These catalysts and their operating conditions are well known to those skilled in the art. Examples of catalysts are acetic anhydride, sulfonic acid, p-toluenesulfonic acid, sulfuric acid, hydrochloric acid, calcium hydroxide, calcium alkoxides, sodium hydroxide, sodium alkoxide, hydroxides and alkoxides of transition metals, antimony compounds, alkaline salts of zinc, magnesium, aluminum, and the like.

The fluidized bead is supported by upwardly flowing gases. The gases comprise monomer and usually one or more inert gases such as nitrogen, ethane, propane, butane and isobutane. The gases may also contain effective amounts of components that may effect the reaction such as moderators, chain terminators, and static control agents. Those components include hydrogen, water vapor, carbon monoxide, carboxyl-containing compounds such as ketones, aldehydes and carboxylic acids, and hydroxyl-containing compounds such as alcohols and glycols including methanol, ethanol, isopropanol, propanol and ethylene glycol.

The superficial velocity of the upwardly flowing gas is sufficient to support and fluidize the bed. The minimum velocity for fluidization will be dependent upon the density and size of the polymer particles and the density and viscosity of the fluidizing gas. Especially since the fluidized bed will contain a range of particle sizes, the superficial velocity should not be so high as to result in undue removal of polymer particles from the bed. Preferably, the velocity of the fluidizing gas during operation at or near the maximum design height of the bed is such that the top surface of the bed is sufficiently turbulent that particles are thrust into the expanded section. These particles include those that are typically not entrained by the fluidizing gas. These particles thrust into the expanded section aid in dislodging any deposits of polymer on the wall of the expanded section and any exposed wall region in the main section of the reaction vessel. In many fluid bed operations the superficial velocity during normal operation is between about 1.2 and 10, preferably 1.3 and 7.5, times the minimum velocity for fluidization of the average sized particle in the reactor. For reactors used to make polyolefins, this velocity is often between about 0.5 and 5, say 0.75 and 4, and most frequently 1 and 3, meters per second. The average particle size of polymer in fluid bed processes is generally within the range of 30 to 2000 microns.

In accordance with this invention, the superficial velocity of the fluidizing gas is lowered to reduce the amount of particles being entrained in the upwardly passing gases and thereby reduce the risk of deposits of polymer being formed on the walls of the reaction vessel at reduced fluidized bed volumes. Desired fluidization properties for the reduced size of the bed are maintained by adjusting the pressure drop to the fluidizing gases passing through the grid. The superficial velocity of the gas is substantially determined by the compressor output for the circulating gases and the pressure drop through the bed. A reduction in superficial velocity must be reversible. It can be caused by turning down the compressor or increasing the pressure drop somewhere in the circulation system. The pressure drop increase may, for instance, be accomplished by partially closing a valve on the line between the compressor and the reactor. In one aspect of the invention, a reduction in superficial gas velocity may be obtained by partially occluding openings in the gas permeable grid.

Gas permeable grids have a plurality of openings through which gas can pass. The openings are preferably uniformly distributed over the grid and are typically of substantially the same size. The openings frequently range from about 1 to 5 or 10 centimeters in major dimension and are between about 1 to 30 centimeters apart. While the openings may be of any shape; circular, oval or oblong such as a slot in cross section are generally used. A baffle or other protector may be positioned above each opening to assist in gas distribution in the fluidized bed and to minimize the volume of polymer particles that would otherwise fall through the opening in the event of a reactor shutdown.

In the processes of this invention, a fluidized bed can be operated at maximum design height and at a reduced height while avoiding undue risk of deposits of polymer at reduced heights. Moreover, the processes enable obtaining desirable energy efficiencies at the full bed height since the openings in the grid can be designed for the normal fluidizing gas velocities to provide lesser pressure drop rather than as compromise to permit operation over a range of fluidizing gas velocities.

The operation at a reduced bed volume may be for any purpose, and often the reduction is to effect start-up, a catalyst transition or a reactor shut down. The reduced heights achievable by the processes of this invention are often less than about 50, preferably less than about 30 percent of the maximum design height for the bed in the vessel. Commercial fluid bed polymerization reactors may have maximum design heights for the bed of at least about 5, and most often at least about 10 to 25 or more, meters and have maximum design aspect ratios (width to maximum design height) of less than 0.5, frequently between about 0.1 to about 0.3. In the processes of this invention, the reduced volume bed typically has an aspect ratio of greater than about 0.4, and sometimes between about 0.5 and 3, say, about 0.6 to 1.

In the processes of this invention, the openings of the grid are adjusted to enable a desired ratio of $\Delta P_p : \Delta P_T$ to be maintained at both lower fluidizing gas velocities used at lower bed heights to reduce the amount of fine particles entrained in the upwardly passing gas and at higher gas velocities used at maximum bed heights and thereby assure good distribution of the fluidizing gas over the cross section of the bed without incurring undue energy costs. This pressure drop ratio is typically at least about 0.15:1, and preferably between about 0.2 to 0.4:1.

Achieving the desired increase in pressure drop across the grid may be accomplished in any convenient manner. For instance, some or all of the openings may be partially or some of the openings may be substantially totally occluded. Care, however, needs to be exercised to assure that substantially uniform fluidization is maintained over the cross section of the reactor and that dead spots are avoided. Substantially uniform gas distribution is achieved when the full cross section of the bed is fluidized and the bed has an absence of zones which are inadequately fluidized. In these zones of inadequate fluidization, particles may more readily contact each other or remain adhered to the wall upon contact and thereby promote agglomeration of polymer. Usually, the rate of gas flow is relatively uniform across the bottom of the bed, i.e., is within a range of about plus or minus 20 percent of the average gas velocity. Conveniently, substantially all, e.g., at least 90 percent, of the openings in the gas permeable grid are relatively uniformly conclude to obtain an increased pressure drop.

The adjustment in pressure drop through the grid may be achieved in any convenient manner. Most usually, the pressure drop is adjusted by changing the effective size of the openings in the grid. The effective size of the openings in the grid may be affected by inserting or removing a flow restriction, e.g., gas impermeable structure that prevents or hinders gas from accessing the opening. Alternatively, flow obstructions may be placed below and/or above the openings in the grid to effect the pressure drop. Flow obstructions may be plates, rods or screens that, while not penetrating the openings, provide additional resistance to gas flow to or from the openings. Of course, combinations of the above techniques may be used if desired.

The technique used in lowering the height of the bed can be useful in preventing undesired fouling of the reactor. The dropping of the bed level can occur using one or more of the following operations. The bed level may be dropped and then the velocity of the fluidizing gas adjusted to a desired velocity. During the dropping of the bed volume, the velocity may be continuously or intermittently adjusted. Another technique which finds preferred applications, is to increase the velocity of the fluidizing gas when the bed is substantially at its design maximum height and immediately prior to the operation for reducing the bed height. At this higher velocity, the bed is expanded, that is, has a reduced bed density, which assures that larger particles continue to flow into the expanded section to scrub polymer deposits from the walls. Simultaneous product withdrawal may be used to keep the bed height, although a reduced density, at the maximum desired height. Thereafter, the velocity of the fluidizing gas is reduced to increase bed density and this quickly lower the bed height. The amount of smaller particles being entrained reduced at the same time the loss of the particles being thrust into the expanded zone through the turbulent action of the bed ceases. This embodiment is particularly useful to quickly, often in less than 5 minutes, lower the bed height for the region of he main section proximate to the expanded section. The relative volume of fines being circulated through the expanded section is thus reduced as well as the potential that the fines would form sheets or agglomerates in the expanded section. Thereafter, the height of the bed may be lowered by withdrawing polymer particles to a third and final height. The pressure drop cause by the grid may be adjusted one or more time corresponding to additional fluidizing gas velocity reductions as the bed is lowered from the second to third heights.

In some instances, it may be desired to partially or completely deactivate the catalyst, e.g., by introducing a retarding or catalyst kill agent such as carbon monoxide. One of the advantages of this invention is that the use of retarding or catalyst kill agents is often not required during the bed lowering. Thus, the production of polymer can continue with the rate of product discharge being sufficient to cause the bed height to drop. Once the bed reaches to desired height, e.g., for a catalyst transition, a catalyst kill agent may be used as needed.

The invention will be further described with reference to the drawings. FIG. 1 sets forth a schematic representation of a gas phase fluidized bed polymerization vessel. In this figure, the polymerization vessel 10 is comprised of a cylindrical main section 11 and an expanded head defining an expanded section 12. At a lower region of the cylindrical main section is distribution plate 14. In operation, upwardly flowing gas is passed through the fluid bed of reacting particles and then Enters the expanded section 12. Gas is removed from the expanded section via line 20. The gas then is compressed by compressor 24 cooled by chiller 26 and reenters reaction vessel 10 in a bottom plenum 13 positioned below distribution plate 14. Makeup, especially monomer, is added through line 32 into line 20. Catalyst is added intermediately or continuously through line 30 into the fluidized bed and product is removed via line 28. A product discharge system can be used to separate the polymer particles from gas which may be reintroduced into the reactor system. One suitable product discharge system is described in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

Under normal operating conditions, the nominal height of the fluidized bed extends up to the base of the expanded section, and this normal height is depicted by level 16 in the drawing. It is understood that under normal operation polymer particles spew into the expanded section and serve to scrub the wall of the expanded section of any growing polymer particles.

Also depicted in FIG. 1 is a desired reduced bed nominal height 18.

When it is desired to reduce the height of the fluidized bed, the superficial velocity of the upwardly flowing gas is reduced but is still maintained above the minimum superficial velocity to maintain fluidization. Often the reduction is at least about 20, preferably between 25 and 40, percent of the first operating condition.

Figure 2A:
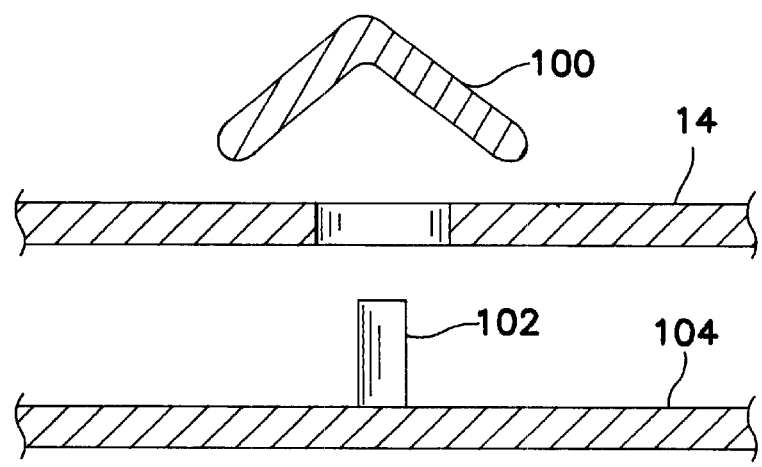
FIG. 2 is a schematic representation of a cross section of the distribution plate for a fluidized bed gas phase polymerization reactor in which subpart (a) depicts a rod which is intended to fit within an opening defined within distribution plate 14 to increase the pressure drop through the opening and subpart (b) is another type of device, a hollow cylinder, to fit within the opening defined within distribution plate to increase the pressure drop through the opening.

The reduction in a superficial gas velocity may be conducted by any number of means, for instance, restricting flow through pipe 20, or more preferably, by increasing the pressure drop through the openings in grid 14. The reduction in superficial gas velocity may be variable or may be effected by a step change, FIG. 2A and B illustrate means for effecting a step change in superficial gas velocity by restricting the openings in grid 14. In FIG. 2A, cylinder 102 mounted on bar 104. Bar 104 can be actuated upwardly to position cylinder 102 into the opening defined by grid 14 in order to close off a portion of the opening. Of course, grid 14 contains many apertures, in commercial operations often up to about 800 or even 2000 or more. Consequently, a cylinder is preferably provided for each of the openings. Baffle 100 serves to distribute the incoming gas and to reduce the passage of polymer particles for the main section to the plenum 13.

Figure 2B:
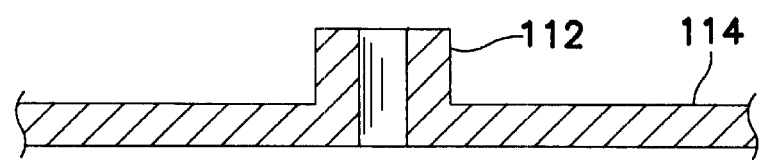

FIG. 2B shows a variant in which instead of a cylinder 102, a pipe 112 is adapted to fit within the opening defined by plate 14. The advantage of use of the pipe is that the flow restriction is defined by the internal diameter of the pipe and is not affected by any polymer buildup around the edges of the opening in the grid 14. Each of the cylinders 102 and the pipes 112 serve to reduce the cross sectional area of the aperture defined by plate 14 by at least about 10 percent, preferably from about 15 to 50 percent.

Figure 3:
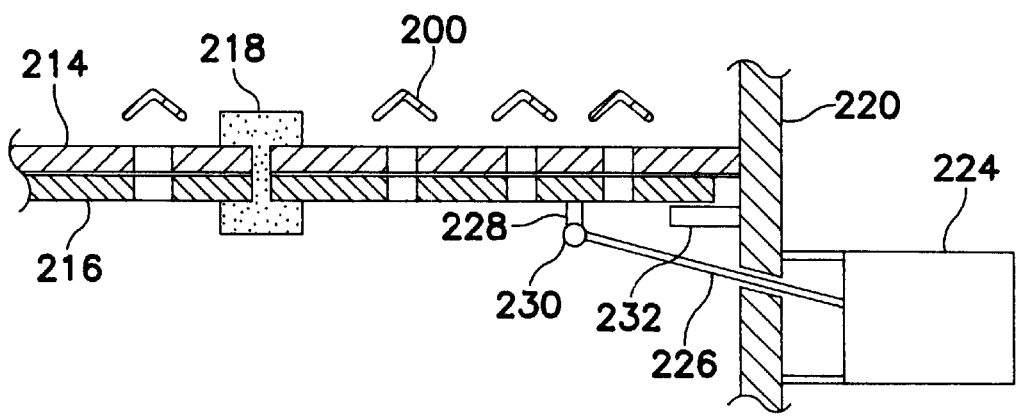
FIGS. 3 and 4 are schematic representations of a cross section of a distribution plate with a lower plate having apertures designed to allow unrestricted gas flow through the apertures and the distribution plate in a first position or to restrict gas flow in a second position.

In FIG. 3, the restriction to the openings defined by grid 14 can be infinitely varied. In this embodiment, a plate 216 is provided below grid 214 and is adapted to be rotated with respect to plate 214. Grid 214 is affixed permanently to the wall of the polymerization vessel 220. The underlying plate 216 is rotatively mounted and is secured by bolt 218 at the axis of both plates 214 and 216 and supported at wall 220 of the reactor vessel by flange 232. The rotation of plate 216 is effected by actuating motor 224 which moves lever 226 which is pivotally affixed via universal joint 230 to flange 228 from plate 216.

Figure 4:
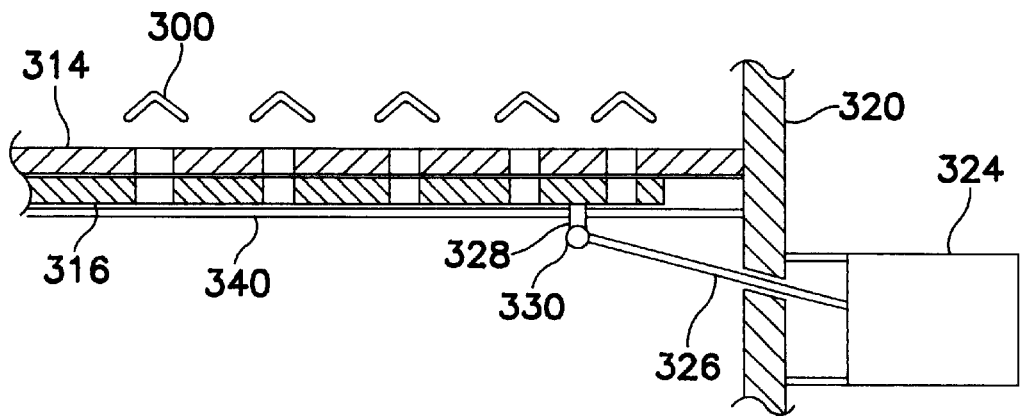

The apparatus depicted in FIG. 4 is similar to that in FIG. 3 except that the plate 316 below grid 314 is adapted to slide with respect to grid 314 and thereby restrict the openings. As depicted, Grid 314 is affixed permanently to the wall of polymerization vessel 320. The underlying plate 316 rests con tracks 340 which are secured into the wall of the polymerization vessel. Plate 316 is moved by actuating motor 324 which moves lever 326 which is attached by hinge 330 to flange 328 from plate 316.

Figure 5:
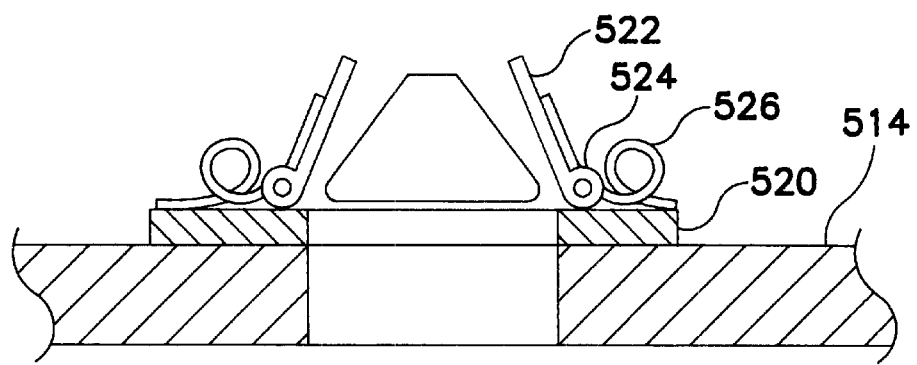
FIG. 5 is a schematic representation of a self adjusting orifice for use with grids to cause a relatively uniform pressure drop to gases over a range of gas velocities.

FIG. 5 schematically depicts a self adjusting restriction to openings in grid 514. Flaps 522 are attached by hinge 524 to assembly base 520 which in turn is positioned concentrically above an opening defined by grid 514. Springs 526 are positioned on the back side of each flap 522 to provide a force tending to close the opening. As the velocity of the gas increases to the reaction vessel, the flaps open wider. Thus, over a range of gas velocities, the pressure drop caused by the grid can remain relatively constant.

Figure 6:
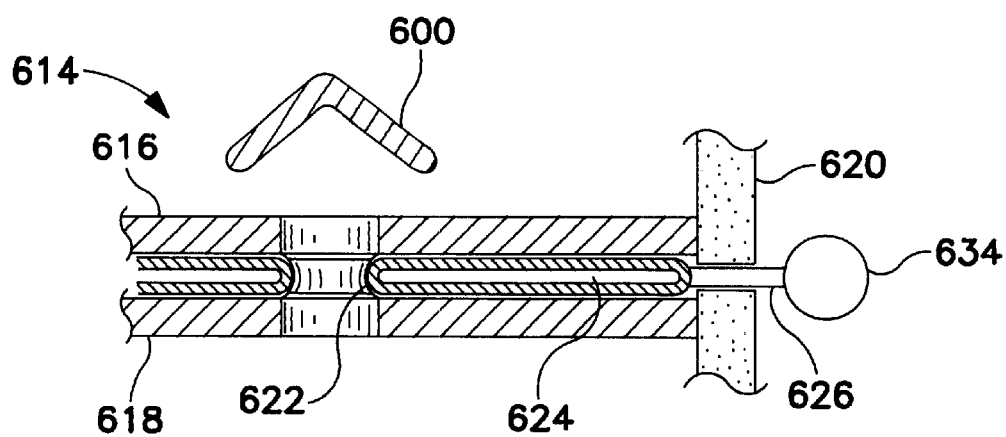
FIG. 6 is a schematic representation of a three layer grid with the intervening layer being an elastomeric bladder capable of being inflated to restrict the openings in a grid.

FIG. 6 schematically depicts an elastomeric bladder that can restrict the openings in the grid. As depicted, grid 614 comprises upper rigid plate 616 and a parallelly disposed, spaced-apart lower rigid plate 618 between which is positioned bladder 622. The upper and lower rigid plates are fixed to wall 620 of the reactor vessel. Each of the upper and lower rigid plates and the bladder define a plurality of openings which are axially aligned. Above each opening is positioned baffle 600.

The bladder 622 has an internal volume 624 which is adapted to contain fluid supplied through conduit 626 which is in communication with fluid pressure control 634. By varying the pressure of the fluid in the internal volume of the bladder, the bladder can expand into or recede from the openings and thereby adjust the pressure drop incurred by the gas flowing through the grid. The pressurizing fluid may be liquid or gaseous and is preferably inert to the polymerization reaction in the event of a break in the bladder.

It is claimed:

1. A process for operating a gas phase fluidized bed containing polymer particles contained within a polymerization vessel over a range of bed heights, said vessel having walls defining a cylindrical main section, a gas permeable grid at a lower region of the main section above which the fluidized bed resides, wherein:

a) a gas containing monomer is upwardly and continuously passed through the grid and into the main section of the polymerization vessel at a first velocity sufficient to maintain the fluidized bed at a first height in a fluidized condition wherein the openings in the grid are sufficient to provide a ratio of the pressure drop through the grid ($\Delta P_p$) to the pressure drop through the grid and bed ($\Delta P_T$) of at least about 0.15:1;

b) the height of the fluidized bed is changed from a first height to a second height and the velocity of the upwardly passing gas is changed to a second velocity; and c) the openings in the grid are adjusted to maintain a ratio of the pressure drop through the grid to the pressure drop through the grid and bed ($\Delta P_p/\Delta P_T$) of at least about 0.15:1.

2. The process of claim 1 wherein the process is continuous and the polymerization is exothermic, the vessel further comprises an expanded section integral with and above the main section and the upwardly passing gas is recycled by being withdrawn from the expanded section and reintroduced into the main section, at least a portion of the recycled gases sufficient to maintain the bed in a fluidized condition are passed through the gas permeable grid.

3. The process of claim 2 wherein at neither the first nor the second height is the $\Delta P_p:\Delta P_T$ ratio greater than about 0.4:1.

4. A process for reducing the height of a gas phase fluidized bed containing polymer particles contained within a polymerization vessel over a range of bed heights, said vessel having walls defining a cylindrical main section, a gas permeable grid at a lower region of the main section above which the fluidized bed resides, wherein:

a) a gas containing monomer is upwardly and continuously passed through the grid and into the main section of the polymerization vessel at a first superficial velocity, said first superficial velocity being sufficient to maintain the fluidized bed at a first height in a fluidized condition wherein the $\Delta P_p:\Delta P_T$ ratio is at least about 0.15:1;

b) polymer particles are withdrawn from the main section to lower the bed from a first height to a second height;

c) adjusting the velocity of the upwardly flowing gas to a second superficial velocity sufficient to maintain the bed at a second, reduced height in a fluidized condition; and adjusting the openings in the grid to maintain the $\Delta P_p:\Delta P_T$ ratio at least about 0.15:1.

5. The process of claim 4 wherein the superficial velocity is gradually reduced from said first superficial velocity to said second superficial velocity.

6. The process of claim 5 wherein polymer particles are withdrawn from the main section during the gradual reduction in superficial velocity to reduce the height of the bed.

7. The process of claim 2 wherein the superficial velocity of the upwardly passing gas is at least in part reduced by a step-change.

8. The process of claim 7 wherein the step-change reduction in superficial velocity of the upwardly passing gas is achieved by effecting a step-change in the pressure drop through the grid.

9. The process of claim 2 wherein the polymerization process is for the polymerization of one or more alpha-olefinic monomers, and the weight average particle size is between about 30 and 2000 microns.

10. The process of claim 2 wherein the first superficial velocity is between about 0.5 and 5 meters per second, and the second superficial velocity is at least about 25 percent lower.

11. The process of claim 4 wherein catalyst is catalyst for the polymerization is continuously or intermittently introduced into the main section and at the second superficial velocity the catalyst introduced is changed from in a first catalyst to a second catalyst.

12. The process of claim 11 wherein the second bed height is less than about 30 percent of the first bed height.

13. The process of claim 5 wherein the second bed height is less than about 30 percent of the first bed height.

14. A process or reducing the height of a gas phase fluidized bed containing polymer particles contained within a polymerization vessel over a range of bed heights, said vessel having walls defining a cylindrical main section, a gas permeable grid at a lower region of the main section above which the fluidized bed resides, and an expanded section integral with and above the main section, wherein:

a) upwardly passing gas containing monomer for polymerization through the grid and into the main section of the polymerization vessel at a first superficial velocity sufficient to maintain the fluidized bed in a fluidized condition wherein the ratio of the pressure drop through the grid ($\Delta P_p$) to the pressure drop through the grid and bed ($\Delta P_T$) is at least about 0.15:1, wherein said first superficial velocity is also sufficient to i) entrain and carry particles into the expanded section and ii) extend the bed to a first height in the reactor;

b) reducing the velocity of the upwardly passing gas to a second superficial velocity sufficient to maintain the fluidized bed in a fluidized condition and to reduce the amount of particles carried into the expanded section;

c) removing polymer particles from the main section to reduce the height of the bed to a second height; and d) at least once during steps b) and c) adjusting the pressure drop through the grid to maintain the $\Delta P_p:\Delta P_T$ ratio at least about 0.15:1.

15. The process of claim 14 wherein the polymerization is exothermic and polymer is capable of forming agglomerates on the walls of the expanded section, and the first superficial velocity is sufficient to provide a sufficient flow of entrained particles into the expanded section to reduced the tendency of agglomerates to form on the walls of the expanded section.

\* \* \* \* \*